United States Patent

[11] 3,622,150

| [72] | Inventor | Leonard L. Hayes |
| --- | --- | --- |
| | | Lewiston, Idaho |
| [21] | Appl. No. | 871,478 |
| [22] | Filed | Oct. 20, 1969 |
| [45] | Patented | Nov. 23, 1971 |
| [73] | Assignee | Potlatch Forests, Inc. |
| | | Lewiston, Idaho |
| | | Continuation-in-part of application Ser. No. 773,815, Nov. 6, 1968, now abandoned. This application Oct. 20, 1969, Ser. No. 871,478 |

[54] SHEET CONVEYING AND STACKING APPARATUS
13 Claims, 7 Drawing Figs.

| [52] | U.S. Cl. | 271/68, 214/6 D |
| --- | --- | --- |
| [51] | Int. Cl. | B65h 29/70 |
| [50] | Field of Search | 271/68, 69, 75; 214/6 D, 6 K, 6 DS |

[56] References Cited

UNITED STATES PATENTS

| 2,472,225 | 6/1969 | Muddiman | 214/6 K |
| --- | --- | --- | --- |
| 2,622,876 | 12/1952 | Schefe | 271/68 |
| 3,064,827 | 11/1962 | Bostock et al. | 214/6 K |
| 3,160,413 | 12/1964 | Faeber | 271/68 |

Primary Examiner—Joseph Wegbreit
Attorney—Wells, St. John & Roberts

ABSTRACT: An apparatus and process for handling sheets of resilient materials, particularly veneer. The apparatus includes a feeding device for arching each sheet, a conveying device for the sheets while maintained in an arched configuration and a plurality of release devices located along the conveying device for dropping the sheets into vertical stacks. The conveying apparatus maintains each sheet in an arched configuration transversely across the sheet, maintaining the required rigidity in the sheet without intermediate supports along the conveyor area. The present process of sheet handling involves the steps of transversely arching each sheet, conveying the arched sheets and release of the sheets onto a flat stack.

SHEET CONVEYING AND STACKING APPARATUS

RELATED APPLICATIONS

This is a continuation-in-part of U.S. application Ser. No. 773,815, abandoned upon the filing of this disclosure.

BACKGROUND OF THE INVENTION

The present sheet-handling apparatus and method were designed particularly for use in plywood and veneer manufacturing processes, being adapted to convey, sort and stack veneer sheets of various sheet widths. The apparatus and method have utility in other applications wherein rectangular sheets of resilient material must be conveyed, stored and stacked.

In the plywood industry, veneer is peeled from a log and directed along multiple conveyors to a clipper. The clipper is used to trim each sheet to the maximum usable width permitted by the nature of the wood veneer. All veneer sheets are produced with substantially the same length, the length of each sheet being transverse to the conveying devices. The sheets of wood veneer in their initial "green" state must then be stacked for later use, generally being arranged according to width and quality. Pieces of veneer having a length shorter than the clipped length (known as "fishtails") and other deformed sheets of veneer having irregular thickness and edge defects are not placed in such stacks, but are directed to a conveying assembly which carries them away to be chipped for pulp purposes.

The operations carried out by the apparatus disclosed herein are conventionally accomplished by a crew of men along a plywood mill "green chain." These men stand along the length of a conveyor on a horizontal table which supports the veneer sheets as they come from a clipper. The men manually lift each sheet from the conveyor and place them in stacks within bins. This requires considerable manual effort, since each size of veneer must be handled by one or two men adjacent to the bin for that size.

SUMMARY OF THE INVENTION

The invention basically comprises a novel conveyor including a pair of endless belts having upright flights that face one another. A feed mechanism at the infeed ends of the belts arches each veneer upwardly in a transverse orientation (parallel to the wood grain in the case of veneer sheets) and directs each sheet to the belts, where the side edges of the sheets are frictionally engaged by the belt surfaces. Longitudinal guides are provided inward of the belts to assist in maintaining the sheets in proper position as they move along the length of the conveyor. One or more stacking assemblies are located along the belt, comprising sheet receiving means under the belt and release means are provided above each stacking assembly for engaging each sheet and releasing it from contact with the moving belt. Each sheet so released is free to drop between the belts for stacking purposes. Various manual or automatic controls can be provided for this release function.

The present method encompasses the steps of arching each sheet and subsequently conveying the sheets from one location to the next while maintaining each sheet in a self-supporting arched configuration. The step of arching each sheet is preferably accomplished progressively during sheet movement along a feed conveyor. The conveying of the sheets is preferably accomplished by moving elements at each sheet side which engage the respective sheet side edges.

It is a first object of the invention to provide a novel sheet conveyor assembly wherein flexible sheets can be moved along the length of the assembly by engagement of their side edges, the area spanned by the sheets being completely free of physical obstruction.

Another object of this invention is to provide a novel conveyor that is capable of longitudinally moving flexible sheet material and which permits the materials to be dropped along the length of the conveyor without the necessity of shifting the sheets to one side or the other from their normal line of movement along the conveyor.

Another object of this invention is to provide a relatively simple physical apparatus and practical method for handling flexible sheets such as green veneers without damaging the sheet material. These and further objects will be evident from the following disclosure, taken together with the enclosed drawings. The drawings illustrate the essential elements of the apparatus, which are obviously capable of modification to meet particular requirements in a given installation.

DESCRIPTION OF THE PREFERRED EMBODIMENT

Reference shall be made herein to the handling of "sheets" of relatively thin resilient material having a normally flat configuration and capable of being formed into a self-supporting curved arch without permanent deformation or "set." Each sheet must have a pair of "side edges" substantially parallel to one another. The term "side edges" relates to the positions of these reference edges along the sides of a longitudinal conveyor. In the specific instance of veneer sheets, the "side edges" of each sheet along the conveyor are located across the longer ends of the sheet and are perpendicular to the wood grain, since a single length is common to sheets having a variety of clipped widths.

The present process is applicable to sheets made of any material capable of being arched without permanent deformation. Arching of such sheets lends stability to the sheet by stiffening the sheet. It also eliminates the need for sheet support other than at locations at or adjacent to the sheet side edges.

The process disclosed herein, exemplified by the operation of the specific apparatus in the drawings, involves three basic method areas: (1) the feeding of sheets and forming of a self-supporting arch across the individual sheets; (2) the conveying of the arched sheets; and (3) the stacking of the sheets in their original flat configurations.

The step of arching each sheet is accomplished by engaging opposite sheet surfaces and bending each sheet into a self-supporting arch without causing deformation of the material. This can be accomplished during longitudinal travel of the sheet by progressively arching the sheet in a direction transverse to its direction of travel. Arching of the sheet may be caused by engaging one sheet surface along the longitudinal center of the sheet for movement along a first path and simultaneously engaging the remaining surface at each side for movement along paths diverging from the first path.

The conveying step requires that inwardly directed forces be applied to the respective side edges of each sheet so as to maintain the arched configuration during sheet travel. In the example shown, the side edges themselves are engaged for this purpose and are maintained in horizontal planes while spanned by an upwardly extending arch. This leaves the entire area below the sheet free of support.

The stacking step involves the application of forces to the sheet to release the inward forces that maintain the arched configuration. The sheet is thus free to return to its original flat or planar configuration. In the example this force application is directed downwardly and inwardly adjacent the respective sheet side edges, permitting the sheets to fall in a vertical stack as they are released.

The structure described in detail below will be discussed in terms of an apparatus for handling sheets of veneer. It is designed specifically for the length of such sheets, which are relatively thin and normally of considerable dimension. The length of such veneer is typically slightly more than 8 feet, this length being located in a transverse direction relative to the conveyor assemblies along which it travels. The width of each sheet is clipped to various dimensions, typically widths of 54 inches, 27 inches, and miscellaneous random widths necessitated by veneer peculiarities. In addition, the clipped veneer will include various pieces which are shorter than the required lengths, these pieces being commonly termed "fishtails." As the veneer sheets are clipped, these assorted sizes must be sorted and stacked for future use in plywood production. The shorter pieces are either sorted to produce crossbands having a length slightly greater than four feet, or are directed to a chipping unit.

The apparatus is designed specifically for veneer production, but can be readily envisioned as a conveying, stacking or sorting device for other sheet materials having a constant width across the conveyor. So, while the description will refer to "veneers" it is to be borne in mind that the sheets handled by the apparatus can be of other than wood materials.

Figure 1:
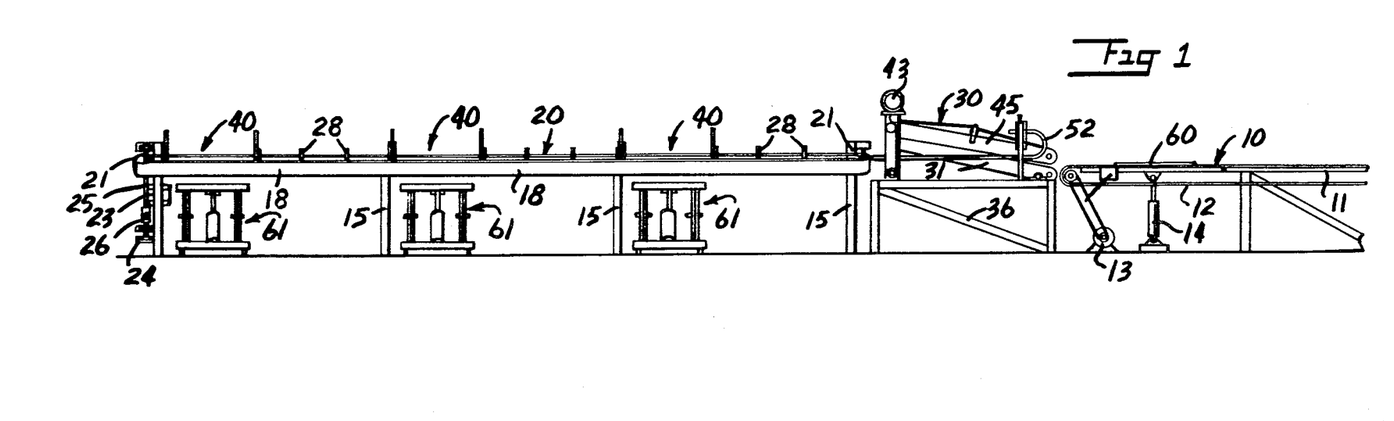
FIG. 1 is a side elevation view of the apparatus as used for green veneer.
Figure 2:
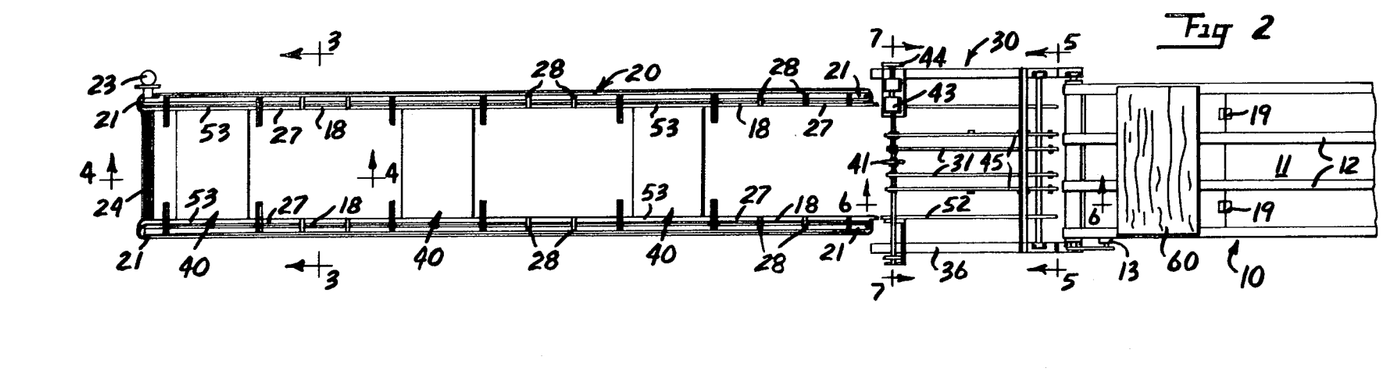
FIG. 2 is a top view of the apparatus in FIG. 1.

As seen in FIGS. 1 and 2, the present structure is utilized at the exit end of a supply conveyor assembly 10. The supply conveyor assembly may be part of a clipper for the sheets or might be a transporting conveyor of any required length in a particular installation. The sheet conveyor assembly is shown generally at 20, leading past the series of sheet stacking assemblies shown at 40. The sheets of material are vertically stacked according to size at the successive assemblies 40. A feed mechanism 30 is inserted between the supplier conveyor assembly 10 and the sheet conveyor assembly 20, the principal purpose of the feed mechanism 30 being to effect a transition from the flat position of the sheets on assembly 10 to the transversely arched condition required by the sheet conveyor assembly 20. These general machine areas are more specifically described below.

The supply conveyor assembly 10 might be of any desired type, generally involving a supporting table 11 and a series of longitudinal powered belts or chains 12. The table 11 provides transverse support for the sheet materials on the conveyor assembly regardless of width. The powered belts of chains 12 move the sheets longitudinally, from right to left as seen in FIGS. 1 and 2. The powered belts or chains 12 are operated by a motor 13 or other suitable power drive mechanism. As shown, a control cylinder 14 can be selectively utilized to drop the exit end of the table 11 about hinges 19 to direct the sheets to a recessed waste conveyor which carries the unusable portions of the veneer sheets to a chipping apparatus. The recessed conveyor is not shown in the drawings, but is of the type commonly used in veneer installations for handling reject material and wood waste. Under normal operations, a sheet that is to be stacked is directed along the supply conveyor 10 with the table 11 continuing in a horizontal condition as illustrated. This disclosure is not limited to a horizontal supply conveyor assembly, since the longitudinal conveyor assembly 10 might be inclined upwardly or downwardly as it leads to the feed mechanism 30.

The sheet conveyor assembly 20 is mounted on a rigid supporting framework 15. At each side of the open framework 15 are longitudinal conveyor frames 16 fixedly supported by upstanding brackets 22 which permit angular adjustment of the conveyor frames 16 about longitudinal axes along the sides of framework 15. This permits adjustment of the angle of tilt of the conveyor frames 16 when desired.

The upright conveyors comprise essentially a backing channel 17 which is a part of the conveyor frame 16 at each side of assembly 20 and endless belts 18 which are of conventional rubber fabric or other suitable material for frictionally engaging the side edges of the sheet material carried by the assembly. At their respective ends, belts 18 wrap about rolls 21 on conveyor frame 16.

The forward rolls 21 for the belts 18 are shown powered by a motor 23 (FIG. 3) which drives a cross chain 24 that extends across the framework 15. Chain 24 in turn rotates upright shafts 25 leading to rolls 21 through universal joints 26. Belts 18 are powered in such fashion that the inwardly facing upright flights along the surfaces of channels 17 move in unison from right to left in FIG. 2. The belts 18 are normally driven continuously at a constant speed during operation of the apparatus.

Figure 3:
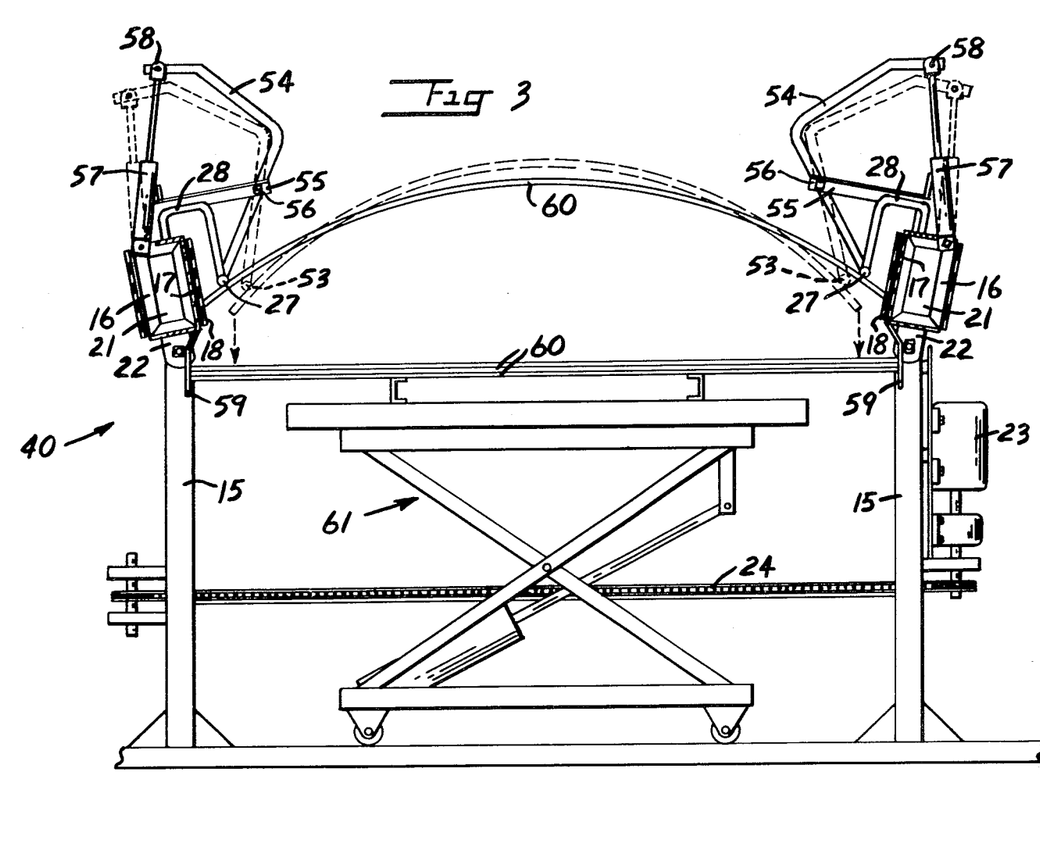
FIG. 3 is an enlarged cross-sectional view taken along line 3—3 in FIG. 2, illustrating the release of a sheet in dashed lines.
Figure 4:
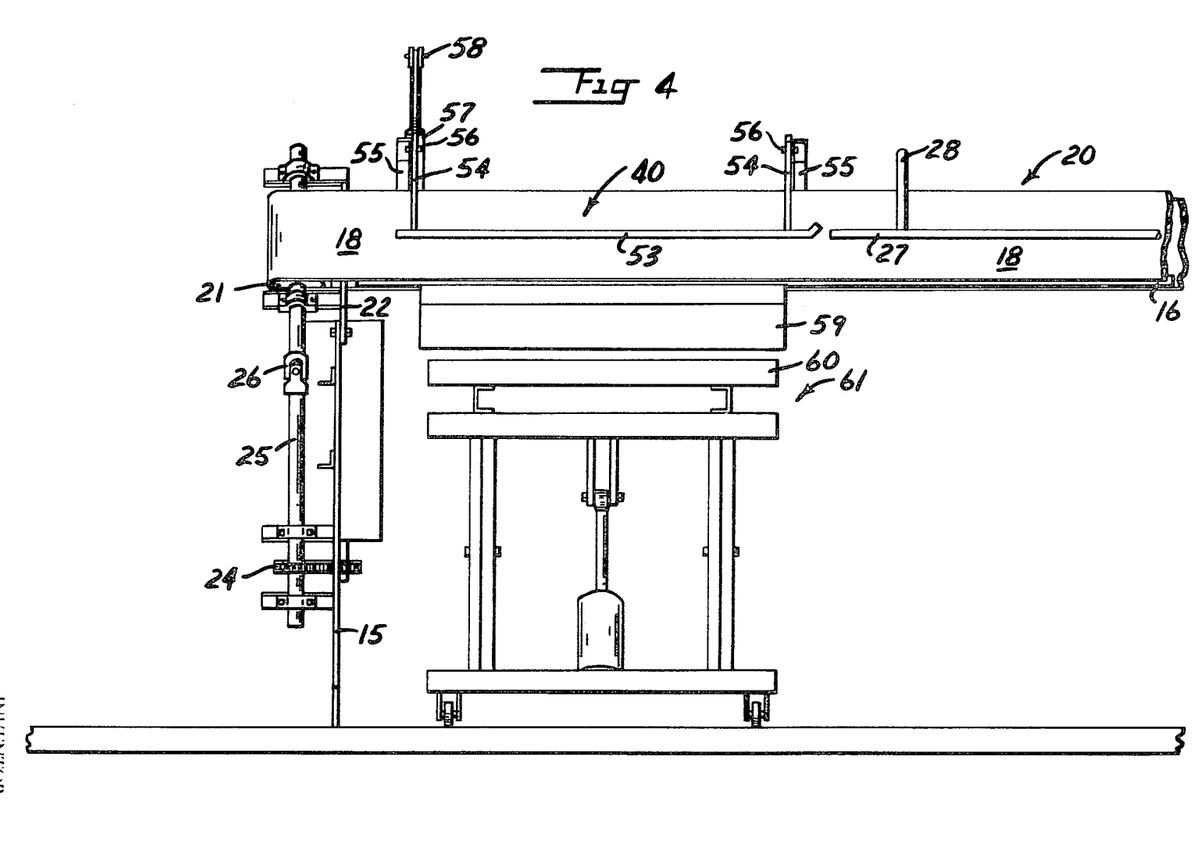
FIG. 4 is an enlarged sectional view taken along line 4—4 in FIG. 2.

As shown in FIG. 3, a sheet of material, such as veneer 60 is arched transversely and frictionally engaged along its side edges by the inner flights of belts 18. The grain of veneer 60 extends transversely to the conveyor. To prevent slippage or gradual movement of the edges of the sheets while so supported, it is advisable to tilt each conveyor frame 16 as shown, the angle of tilt being approximately 10° from vertical. Each sheet engaging surface is thereby oppositely inclined from a plane normal to a transverse plane across the belt surfaces. In this manner, the working flight of the respective belts 18 are seen to converge downwardly toward one another, which would tend to crowd the engaged side edges of the sheets 60 in an upward direction. To counteract this, there are provided longitudinal guide rods 27 along the full length of belts 18, the guide rods 27 being particularly useful in handling of sheets of varying width. Rods 27 are stationary and supported by brackets 28 on the conveyor frames 16. The guide rods 27 have horizontal lower surfaces which extend along the length of the belts at an elevation intermediate the elevations of the respective edges of the working flights of belts 18.

Figure 5:
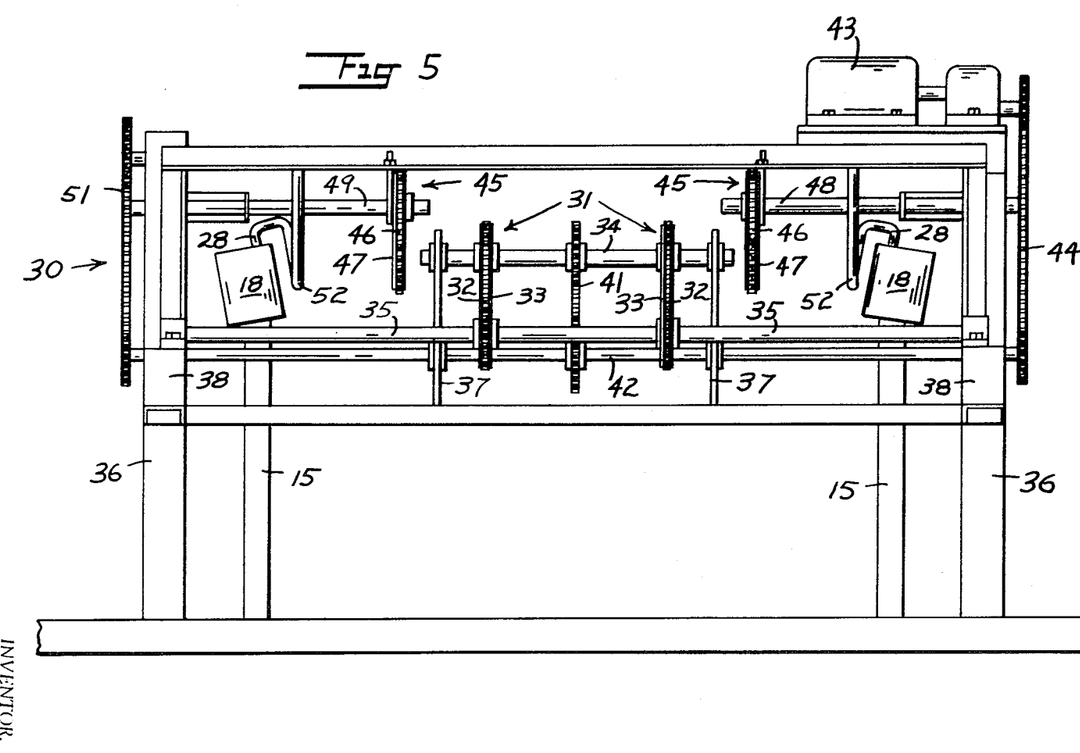
FIG. 5 is an enlarged view taken along line 5—5 in FIG. 2.
Figure 6:
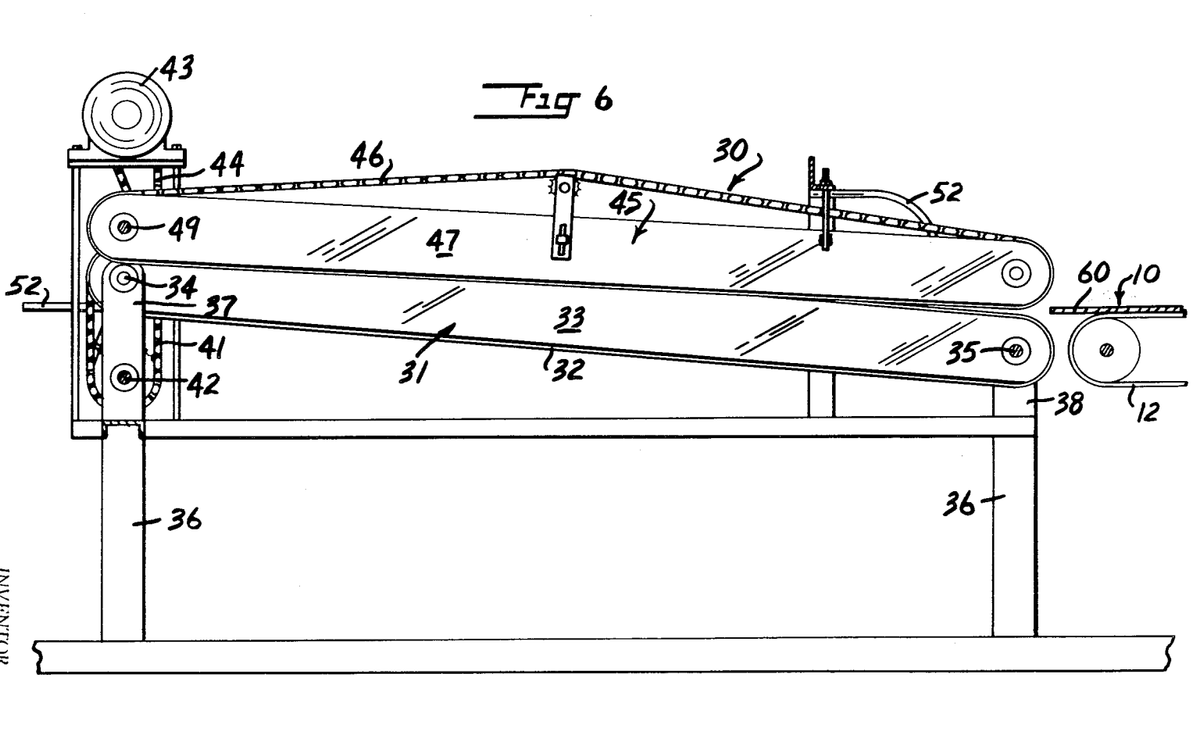
FIG. 6 is an enlarged sectional view taken along line 6—6 in FIG. 2.
Figure 7:
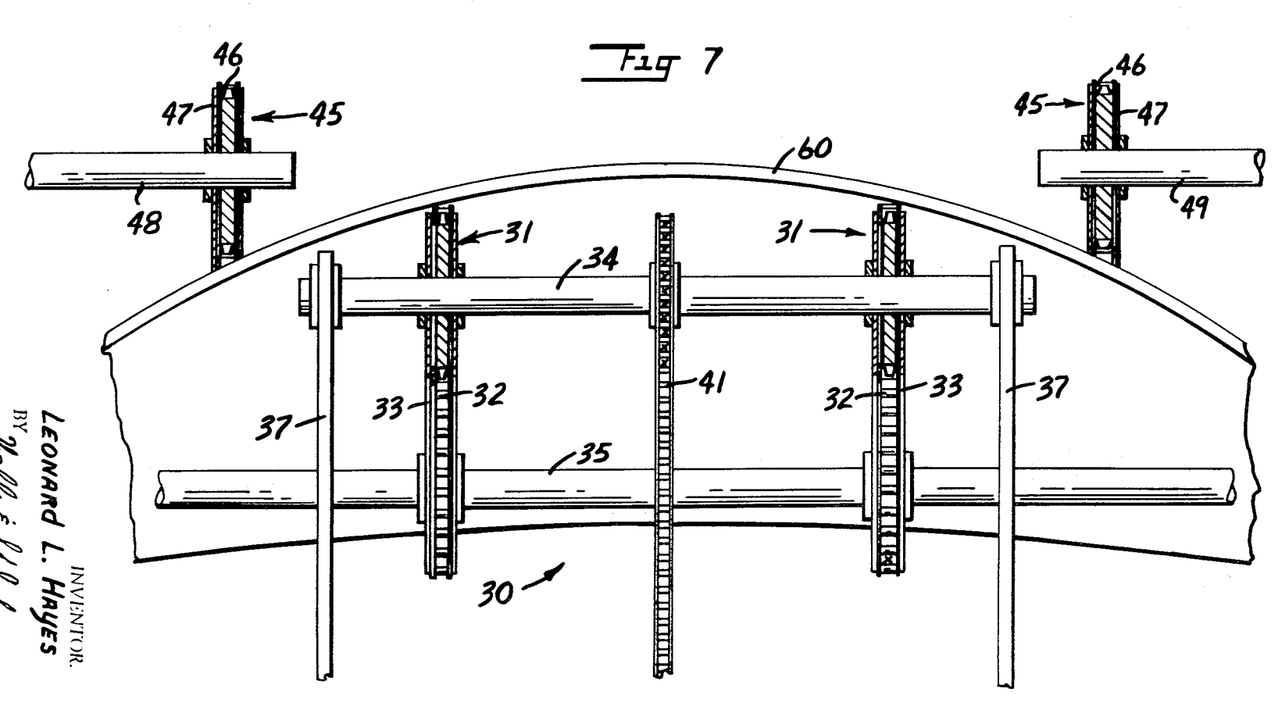
FIG. 7 is an enlarged fragmentary sectional view taken along line 7—7 in FIG. 2.

To direct individual sheets 60 to the belts 18, it is necessary that each sheet be arched transversely by bringing the side edges of the sheet toward one another, since the separation between the working flights of the belts 18 is less than the normal sheet width. This is accomplished by the structure shown in FIGS. 5, 6 and 7. The feed mechanism 30 includes a central sheet engaging element in the form of a pair of conveyor 31 and outer sheet engaging elements in the form of a pair of conveyors 45 which cooperate to properly shape each sheet entering the sheet conveyor assembly 20. The central conveyors 31 each comprise an endless chain 32 carried on a supporting track 33. Tracks 33 and the upper flights of chains 32 have an upwardly facing plane configuration along which the sheets of material travel. The tracks 33 are supported on transverse shafts 34, 35, which are used to power chains 32 through conventional supporting sprockets. Shafts 34, 35 are rotatably carried on the supporting frame assembly 36 by upright support brackets 37, 38 respectively (FIGS. 6, 7). The forward shaft 34 is powered by a central drive chain 41 drivingly engaging a sprocket on shaft 34. Chain 41 is powered from a transverse driving shaft 42 which in turn is operatively connected to a drive motor 43 by a side power chain 44 (FIGS. 5, 6).

The outer conveyors 45 are positioned to each side of central conveyors 31. They also comprise endless longitudinal chains 46 supported by tracks 47. The tracks 47 and chains 46 have plane downwardly facing reaches adapted to engage the upper sheet material surfaces (FIG. 6). Tracks 47 are rigidly carried on framework 36, the chains 46 being driven by stub shafts 48, 49 at the respective sides of the apparatus (FIG. 7). The ends of chains 46 are supported by conventional sprockets, and can be provided with any suitable type of device for taking up slack along the upper flight of each chain. The shaft 48, shown at the right in FIG. 5, is powered directly from chain 44. Shaft 49, at the left, is driven by a supplementary chain 51 powered by cross-shaft 42. The drive connections are such as to propel the upper flights of chains 32 and the lower flights of chains 46 in the same direction (from right to left in FIG. 6) and at identical speeds.

Referring to FIGS. 6 and 7, the upper flights of chains 32, which engage sheets 60 adjacent to their longitudinal centerlines, extend from the elevation at the exit end of the supply conveyor assembly 10 to a delivery elevation that is above the elevation of guide rods 27, thereby providing the desired transverse arch in each sheet. The lower flights of chains 46 overlap the paths of chains 32 and diverge therefrom in the direction of movement of the respective sheet contacting flights. The coaction of chains 32 and 46 during travel of the sheets gradually arches each sheet without subjecting them to sudden or severe bending stresses. The arching of the sheets is further accomplished by extensions 52 of the guide rods 27. The extensions 52 serve to gradually lead the side edges of each sheet 60 to the desired arched configuration as the sheet is being arched by action of chains 32, 46. Suitable combinations of conveying chains, belts and guides can be utilized for proper feeding of the sheets.

The feed mechanism 30 serves to arch each sheet to a condition wherein the resiliency of the sheet itself will hold the sheet against the moving upright belts 18 in the manner shown in FIG. 3. The sheets will continue along the length of the belts 18 until the frictional engagement between the sheet side edges and belts 18 is released. According to the disclosure, this is accomplished at a series of sheet stacking assemblies 40, there being three such units shown in FIGS. 1 and 2. A greater or less number of such assemblies can be provided in a particular installation.

The sheet stacking assembly basically comprises longitudinal pusher rods 53 at each side of the framework 15. The rods 53 are normally located as continuations of the guide rods 27 discussed above. Each rod 53 is fixed to a pair of supporting arms 54 which are pivotally connected to inwardly extending brackets 55 on respective conveyor frames 16 (FIG. 3). The support arms 54 are pivoted to brackets 55 about longitudinal axes indicated by the pivotal connections 56. Each rod 53 is controlled in position by means of a selectively operable cylinder assembly 57 connected between the conveyor frame 16 and a rigid extension of one support arm 54. The pivotal connection between the cylinder assembly 57 and support arm 54 is indicated by the numeral 58.

As shown in FIG. 3, each cylinder assembly 57 can be operated to move the support arms 54 and rod 53 from the normal position shown in full lines to the sheet releasing position shown in dashed lines. The resulting change in attitude in a sheet 60 is also shown in dashed lines in FIG. 3.

The cylinder assemblies 57 should preferably be very quick acting. Such quick movement can be effectively achieved by use of pneumatic cylinders. The rods 53 strike along the complete face of the sheet 60 simultaneously at both sides thereof and cause the sheet to move inwardly from belts 18 without rubbing along the belt surfaces. Such rubbing would cause tearing of the sheet material, particularly in the case of wood veneers. Once the sheet has been moved inwardly from belts 18 as shown in dashed lines in FIG. 3, it is free to fall vertically between the space separating belts 18. As it falls, it is guided by sideplates 59 and comes to rest on a stacking table assembly generally shown at 61. The stacking table assembly 61 can be of any suitable conventional type, preferably being one that is vertically adjusted to accommodate the increasing height of the stack of veneers.

When used for veneer stacking and sorting purposes the several sheet stacking assemblies 40 are preferably utilized to receive different veneer widths. For instance, one assembly might collect all full width veneers. Another might collect all veneers of half width, preferably alternating the position of successive veneers so that the veneers will be stacked in a side by side orientation. This can be accomplished by proper timing of the actuation of cylinder assemblies 57. The third stacking assembly might be used for random width sheets, the actuation again being controlled to drop the sheets on the stacking table assembly in random positions to produce a stable vertical stack. In addition, any short length veneers that are received through the feed mechanism 30 will freely drop between belts 18 at the right-hand end of the sheet conveyor assembly 20, falling upon a receiving conveyor (not shown) which can carry the material to a chipping machine or other suitable apparatus.

Having thus described my invention, I claim:

1. An apparatus for conveying a row of successive normally flat sheets of resilient material having a common width, comprising:
    longitudinal moving conveyor means having opposed sheet engaging surfaces facing toward one another, said surfaces being spaced apart by a distance slightly less than the sheet width;
    feed means for placing the sheets in succession between the surfaces of said conveying means with the side edges of each sheet respectively engaged by the surfaces and aligned parallel to the direction of movement thereof; and
    sheet release means along the length of said conveyor means for selectively moving the sheet edges inwardly of said surfaces to thereby release the sheet from between the surfaces.

2. An apparatus as set out in claim 1 wherein said sheet release means is located at a preselected station along said conveyor means and comprises force applying elements mounted along said conveyor means for urging the side edges of a sheet inwardly of the respective sheet engaging surfaces.

3. An apparatus as set out in claim 1 wherein the surfaces of said conveyor means are spaced apart horizontally;
    said sheet release means being operable for selectively moving the sheet edges inwardly of said surfaces to thereby permit the sheet to fall vertically between said surfaces.

4. An apparatus as set out in claim 3 further comprising:
    stacking receiving means located below said sheet release means for vertically stacking the sheets as they fall between said surfaces.

5. In an apparatus for handling sheets of resilient material having a normal planar configuration and including parallel side edges;
    a longitudinal conveyor having a pair of endless belts including upright working flights facing toward one another, said working flights being spaced from one another by a distance less than the width of a sheet;
    feed means for transversely arching each sheet of material as it is placed in succession between the belts with the respective side edges of the sheet in surface engagement with the working flight of the belts; and
    sheet releasing means engageable with a sheet adjacent at least one side edge thereof for selectively moving said one side edge inwardly from and out of engagement with the conveyor working flight engaged thereby.

6. An apparatus for conveying a row of successive sheets of flexible material having a common width and parallel, transversely spaced side edges, comprising:
    a conveyor having a pair of endless longitudinal belts including planar upright working flights facing toward one another, the respective working flights of said belts being positioned at a common elevation and being transversely spaced from one another by a horizontal distance less than the width of a sheet;
    transversely spaced longitudinal guides positioned inwardly adjacent to the respective working flights of the conveyor; and means operatively connected to said belt for driving the belts in unison with the working flights thereof each moving longitudinally in a common direction;
    and means along said conveyor for urging the side edges of each sheet inwardly of the respective conveyor flights and for permitting the sheets so urged to fall between the belts.

7. An apparatus for conveying a row of successive sheets of flexible material having a common width and parallel, transversely spaced side edges, comprising:
    a conveyor having a pair of endless longitudinal belts including planar upright working flights facing toward one another, the respective working flights of said belts being positioned at a common elevation and being transversely spaced from one another by a horizontal distance less than the width of a sheet;
    transversely spaced longitudinal guides positioned inwardly adjacent to the respective working flights of the conveyor; and means operatively connected to said belt for driving the belts in unison with the working flights thereof each moving longitudinally in a common direction; and a plurality of sheet release means spaced longitudinally along the conveyor for respectively engaging the upper surface of a sheet adjacent the side edges thereof and for urging the side edges of each sheet so engaged inwardly and downwardly so as to cause the sheet to fall between the belts.

8. A method of handling resilient sheets of material capable of being self-supporting in an arched configuration comprising the following steps:

arching each sheet across the full sheet width without permanent deformation of the sheet material;

subsequently conveying the sheet while maintaining such arched configuration by application of inwardly directed forces to the sheet adjacent its respective side edges, the arching of the resilient sheet serving as the sole support of that portion of the sheet inward of the points of application of the forces; and releasing each sheet by applying thereto forces directed downwardly and inwardly at locations adjacent the respective side edges of the sheet, to thereby form a vertical stack of sheets.

9. A method as set out in claim 8 wherein the sheets are permitted to return to their original plane configuration upon release.

10. A method as set out in claim 8 wherein the step of arching each sheet is accomplished by engaging one surface of each sheet along its longitudinal center over the full sheet length for movement along a first path and simultaneously engaging the opposite surface of the sheet at each side of its longitudinal center over the full sheet length for movement along path diverging from said first path.

11. A method as set out in claim 8 wherein the sheets are composed of wood veneer having the wood grain oriented transversely across the sheet and having the transverse edges thereof substantially parallel to one another.

12. A method of handling resilient sheets of material such as wood veneers, comprising the following steps:

supporting the sheets in moving longitudinal row with each sheet assuming a plane horizontal configuration and with the respective side edges of the row of sheets in substantial longitudinal alignment;

aching each sheet while continuing its movement along said row by progressively raising the longitudinal center of the sheet above the elevation of the side edges thereof;

supporting each arched sheet during continued longitudinal movement by applying inwardly directed force to the respective side edges thereof by members moving conjointly with the sheets; and releasing each sheet by applying thereto forces directed downwardly and inwardly at locations adjacent the respective side edges of the sheet, to thereby form a vertical stack of sheets.

13. A method as set out in claim 12 wherein the sheets are permitted to return to their original plane configuration upon release.

* * * * *